United States Patent
Goshen et al.

(10) Patent No.: US 12,111,870 B2
(45) Date of Patent: Oct. 8, 2024

(54) AUTOMATIC DISCOVERY OF RELATED DATA RECORDS

(71) Applicant: EMC IP Holding Company LLC, Hopkinton, MA (US)

(72) Inventors: Idan Richman Goshen, Beer Sheva (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 17/213,946

(22) Filed: Mar. 26, 2021

(65) Prior Publication Data

US 2022/0309100 A1    Sep. 29, 2022

(51) Int. Cl.
| | | |
|---|---|---|
| G06F 16/906 | (2019.01) | |
| G06F 16/9035 | (2019.01) | |
| G06F 16/9038 | (2019.01) | |
| H04L 45/02 | (2022.01) | |

(52) U.S. Cl.
CPC ........ *G06F 16/906* (2019.01); *G06F 16/9035* (2019.01); *G06F 16/9038* (2019.01); *H04L 45/02* (2013.01)

(58) Field of Classification Search
CPC . G06F 16/906; G06F 16/9038; G06F 16/9035
USPC ........................................................ 707/749
See application file for complete search history.

(56) References Cited

U.S. PATENT DOCUMENTS

| | | | | |
|---|---|---|---|---|
| 8,015,140 B2* | 9/2011 | Kumar | ............... | G06Q 10/04 706/46 |
| 8,332,409 B2* | 12/2012 | Waddington | ........... | G06Q 30/02 707/750 |
| 8,429,175 B2* | 4/2013 | Lidstrom | ............. | G11B 27/031 707/748 |

(Continued)

FOREIGN PATENT DOCUMENTS

EP    3923191 A1 * 12/2021    ........... G06K 9/6219

OTHER PUBLICATIONS https://www.bizfilings.com/toolkit/research-topics/marketing/market-research/you-must-understand-your-competition, downloaded on Mar. 18, 2021.

(Continued)

*Primary Examiner* — Tony Mahmoudi
*Assistant Examiner* — Michael Le
(74) *Attorney, Agent, or Firm* — Ryan, Mason & Lewis, LLP

(57) ABSTRACT

Techniques are provided for automatic discovery of data records. One method comprises obtaining data records each corresponding to a different item and comprising features extracted from a data source, wherein the data records identify related items identified using a collaborative filter that relates items based on user preferences; generating an item network comprising multiple nodes each corresponding to a different item, where two nodes are connected by an edge based on: (i) an item type of the two nodes, (ii) a ratio of numerical values associated with the two nodes, and/or (iii) a pairwise configuration similarity score for the two (Continued)

nodes; clustering the nodes into node clusters based on topological properties of the item network; and identifying items related to a given item that (i) share an edge with the given item and (ii) are in a node cluster comprising a node of the given item.

20 Claims, 7 Drawing Sheets

(56) References Cited

U.S. PATENT DOCUMENTS

| | | | | |
|---|---|---|---|---|
| 8,620,909 | B1* | 12/2013 | Rennison | G06F 16/3332 707/723 |
| 8,850,362 | B1* | 9/2014 | Khoshnevisan | G06F 16/951 715/853 |
| 8,954,836 | B1* | 2/2015 | Look | G06F 16/9535 715/205 |
| 9,129,038 | B2* | 9/2015 | Begel | G06F 8/74 |
| 9,135,329 | B1* | 9/2015 | Gupta | G06F 16/3322 |
| 9,135,396 | B1* | 9/2015 | Kalinin | G06F 16/9024 |
| 9,405,773 | B2* | 8/2016 | Chittar | G06F 16/532 |
| 9,558,265 | B1* | 1/2017 | Tacchi | G06F 16/338 |
| 9,798,829 | B1* | 10/2017 | Baisley | G06F 16/9024 |
| 10,007,936 | B1* | 6/2018 | Ghoshal | G06Q 50/01 |
| 10,108,995 | B2* | 10/2018 | Kilroy | G06Q 30/0609 |
| 10,147,129 | B1* | 12/2018 | Shang | G06Q 30/0633 |
| 10,162,868 | B1* | 12/2018 | Zappella | G06F 16/24578 |
| 10,394,913 | B1* | 8/2019 | Chaoji | G06K 9/6223 |
| 10,467,307 | B1* | 11/2019 | Chanda | G06F 16/248 |
| 10,803,472 | B2* | 10/2020 | Wical | G06Q 30/02 |
| 10,956,521 | B1* | 3/2021 | Yu | G06F 16/9535 |
| 11,163,843 | B1* | 11/2021 | Li | G06F 16/906 |
| 2002/0010625 | A1* | 1/2002 | Smith | G06Q 30/0601 705/26.7 |
| 2002/0198882 | A1* | 12/2002 | Linden | G06F 16/904 |
| 2003/0208399 | A1* | 11/2003 | Basak | G06Q 30/02 705/14.67 |
| 2005/0038717 | A1* | 2/2005 | McQueen, III | G06Q 30/0269 705/26.61 |
| 2005/0222987 | A1* | 10/2005 | Vadon | G06F 16/907 |
| 2010/0161619 | A1* | 6/2010 | Lamere | G06F 16/958 707/E17.014 |
| 2010/0161620 | A1* | 6/2010 | Lamere | G06F 16/636 707/E17.014 |
| 2010/0268661 | A1* | 10/2010 | Levy | G06Q 30/02 705/347 |
| 2011/0087644 | A1* | 4/2011 | Frieden | G06F 16/1734 707/706 |
| 2011/0251875 | A1* | 10/2011 | Cosman | G06Q 30/0277 705/7.31 |
| 2011/0314040 | A1* | 12/2011 | Mori | G06F 16/9537 707/767 |
| 2012/0066234 | A1* | 3/2012 | Lee | H04L 67/01 707/E17.084 |
| 2012/0246174 | A1* | 9/2012 | Spears | G06Q 50/01 707/E17.005 |
| 2014/0229307 | A1* | 8/2014 | Kallumadi | G06Q 30/0601 705/26.1 |
| 2014/0279078 | A1* | 9/2014 | Nukala | G06Q 30/0276 705/14.73 |
| 2015/0100458 | A1* | 4/2015 | Linden | G06Q 50/01 705/26.8 |
| 2015/0100459 | A1* | 4/2015 | Linden | G06Q 30/0633 705/26.8 |
| 2015/0379117 | A1* | 12/2015 | Kalinin | G16B 40/30 707/737 |
| 2016/0005097 | A1* | 1/2016 | Hsiao | G06Q 30/0631 705/26.7 |
| 2016/0042296 | A1* | 2/2016 | Shan | G06N 5/022 706/11 |
| 2016/0117740 | A1* | 4/2016 | Linden | G06Q 50/01 705/14.66 |
| 2016/0117749 | A1* | 4/2016 | Desmarais | G06Q 30/0623 382/111 |
| 2016/0140622 | A1* | 5/2016 | Wang | G06Q 50/01 705/14.66 |
| 2016/0162913 | A1* | 6/2016 | Linden | G06Q 30/0202 705/7.31 |
| 2016/0171582 | A1* | 6/2016 | Linden | B60J 1/02 705/26.62 |
| 2016/0171588 | A1* | 6/2016 | Linden | G06F 3/0482 705/26.7 |
| 2016/0307249 | A1* | 10/2016 | Ku | G06Q 30/0613 |
| 2016/0330162 | A1* | 11/2016 | Liu | G06Q 30/0631 |
| 2017/0124576 | A1* | 5/2017 | Lagoni | H04L 67/02 |
| 2017/0206276 | A1* | 7/2017 | Gill | G06F 16/285 |
| 2017/0242909 | A1* | 8/2017 | Kenthapadi | G06Q 50/01 |
| 2018/0005293 | A1* | 1/2018 | Adams | G06Q 30/0625 |
| 2018/0075035 | A1* | 3/2018 | Carlyle | G06F 16/212 |
| 2018/0075515 | A1* | 3/2018 | Yancey | G06Q 10/06398 |
| 2018/0101876 | A1* | 4/2018 | Rosenberg | G06Q 30/0283 |
| 2021/0117459 | A1* | 4/2021 | Tan | G06F 18/24147 |
| 2021/0182935 | A1* | 6/2021 | Malkiel | G06F 16/3347 |
| 2021/0224582 | A1* | 7/2021 | Afshar | G06Q 30/0623 |
| 2021/0382944 | A1* | 12/2021 | Li | G06F 16/906 |

OTHER PUBLICATIONS https://www.price2spy.com/blog/manual-vs-automated-product-matching-which-one-is-the-best-for-your-ecommerce-business/, downloaded on Mar. 18, 2021.
https://www.intelligencenode.com/blog/manually-tracking-competitor-pricing-vs-automated-solutions/, downloaded on Mar. 18, 2021.

* cited by examiner

AUTOMATIC DISCOVERY OF RELATED DATA RECORDS

FIELD

The field relates generally to information processing systems, and more particularly to the processing of data records in such systems.

BACKGROUND

The identification and monitoring of related data records can be a tedious and resource-intensive task. Due to the manual nature of such tasks, they are typically performed in an occasional manner, such as on a monthly basis or a quarterly basis. While this monitoring cadence may suffice for some categories of data records, or for some periods of time, such a cadence may lead to unacceptable delays in taking action in other cases.

SUMMARY

In one embodiment, a method comprises obtaining a plurality of data records, wherein each data record corresponds to a different one of a plurality of items and comprises a plurality of features extracted from at least one data source, wherein at least one data record associated with a first item identifies at least one related item that is related to the first item, and wherein the at least one related item is identified using a collaborative filter that relates at least some of the items of the plurality of items based at least in part on preferences of a plurality of users; generating, using the plurality of data records, an item network comprising a plurality of nodes, wherein each node in the item network corresponds to a different one of the plurality of items, wherein two nodes in the item network are connected by an edge in response to an evaluation of at least one of: (i) an item type of the items associated with the two nodes, (ii) a ratio of numerical values associated with the two nodes, and (iii) a pairwise configuration similarity score for the two nodes, and wherein the pairwise configuration similarity score for the two nodes is based at least in part on a textual analysis of at least one configuration feature, extracted from the at least one data source, for each of the two nodes; clustering the plurality of nodes in the item network into a plurality of node clusters based at least in part on an analysis of one or more topological properties of the item network; and identifying one or more items related to a given item, wherein the one or more identified related items have a corresponding node in the item network that (i) shares an edge with a node in the item network corresponding to the given item and (ii) are in at least one node cluster comprising a node corresponding to the given item.

Other illustrative embodiments include, without limitation, apparatus, systems, methods and computer program products comprising processor-readable storage media.

DETAILED DESCRIPTION

Figure 1:
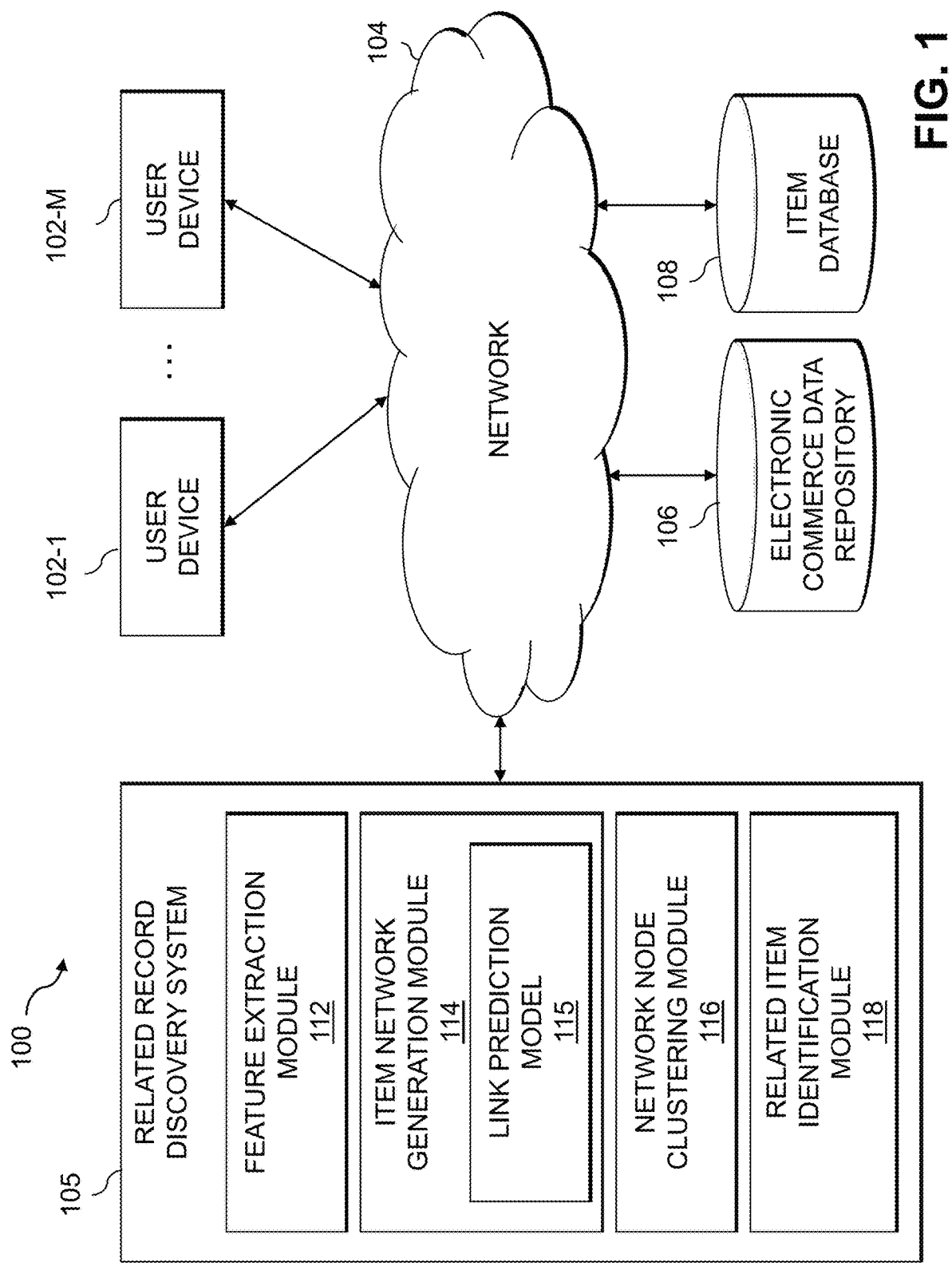
FIG. 1 illustrates an information processing system configured for automatic discovery of related data records in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automatic discovery of related data records, such as data records associated with similar products.

In one or more illustrative embodiments, techniques are provided for automation and discovery of competing products. In at least some embodiments, competing products are discovered by evaluating websites (e.g., using crawling techniques) and extracting information that reveals customer preferences and the decision-making process of customers. In some embodiments, collaborative filtering techniques are employed to reveal customer preferences, such as "users who bought a particular product, also bought product X" or "users who viewed a particular product, also viewed product Y." A network of products is generated in at least some embodiments that connects products that compete with each other, using calculated similarity scores that take into account the product type, price range and configuration, as discussed further below. Given a product, using network analysis algorithms, internal and/or external competitors can be extracted.

While one or more embodiments of the present disclosure are illustrated in the context of products related to the technology sector, the disclosed techniques can be employed in other sectors and more generally for automatic discovery of related data records, as would be apparent to a person of ordinary skill in the art.

As online shopping increases, an increasing amount of data is available. Such data is not typically published, but may be exposed in a number of ways. For example, such collected data allows websites to display collaborative filter content such as "Users who viewed a particular product, also viewed product Z." In addition, traditional electronic commerce (e-commerce) operations and analytics typically involve an analyst to collect, aggregate and analyze relevant data to arrive at a data-driven decision. Many pricing strategies and decision-making processes, for example, rely heavily on product-level competition data to constrain the price of a given product to remain competitive with another product (e.g., the price of the given product should not be much cheaper or more expensive than the price of a competing product). Even when using automated data collection, aggregation and recommendation generators, the core part of knowing the competition is currently still performed manually by domain experts that need to compile a list of competing products that should be monitored.

In order to monitor competitive market prices in an automated fashion, for example, each product should have a list of competing products to have a notion of the "market price." Current practices for compiling such lists often employ an experienced marketing individual. While domain expert knowledge is often valuable and important, it is also subjective, prone to bias and inconsistent. The use of data-backed insights can complement traditional data gathering and also mitigate these caveats.

As the number and/or variety of products grow, additional domain experts are needed to compile and monitor the list of competing products.

The compilation and monitoring of product-level competitors can be a tedious and resource-occupying task. Due to the manual nature of such tasks, they are typically only performed in an occasional manner. For example, updating a list of competing products may be compiled, for example, on a monthly or quarterly basis. As this cadence of updates may suffice for some products, or for some periods of time, such a cadence may mean "being late to the party" in other cases. The use of different update cadences for different types of products is possible, but unlikely to happen. Nonetheless, unless significant resources are allocated to this manual task, it will be inferior to automated competition discovery.

While two products are often considered to be competitive based on having similar hardware and/or software specifications, what often drives competition is consumer usability. For example, the release of a new line of tablet products had a negative impact on computer vendors, as consumers switched away from desktop and laptop computers. Being from a whole different family of products and class of hardware, it would have taken a significant amount of time until such tablets were listed as a competitor for a laptop or a desktop computer.

In one or more embodiments, a network structure having multiple nodes each associated with a different product is analyzed to identify one or more competitive products for a given product. For example, one or more competitive products can be identified for a given product that: (i) are associated with nodes in the network structure that share an edge with the network node associated with the given product and (ii) are found in a same node cluster as the given product.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a related record discovery system 105, an electronic commerce data repository 106 and an item database 108, each discussed below.

The user devices 102 may comprise, for example, host devices and/or devices such as mobile telephones, laptop computers, tablet computers, desktop computers, appliances, electronics products, or other types of computing devices. Such devices are examples of what are more generally referred to herein as "processing devices." Some of these processing devices are also generally referred to herein as "computers."

The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The related record discovery system 105 may be implemented, for example, on the cloud or on the premises of an enterprise or another entity. In some embodiments, the related record discovery system 105, or portions thereof, may be implemented as part of a storage system or on a host device.

As also depicted in FIG. 1, the related record discovery system 105 further comprises a feature extraction module 112, an item network generation module 114, a network node clustering module 116, and a related item identification module 118, each discussed further below. In at least some embodiments, the feature extraction module 112 extracts data from electronic commerce websites (e.g., using crawling techniques) for processing by the disclosed techniques for automatic discovery of related data records.

In at least some embodiments, the item network generation module 114 generates a network structure of items (e.g., products) using key features, as discussed further below in conjunction with FIG. 3. The item network generation module 114 uses a link prediction model 115 in some embodiments, as discussed further below in conjunction with FIG. 3. The network node clustering module 116 optionally clusters nodes in the item network, where the nodes of a given cluster are more closely related to the nodes within the given cluster than to the nodes in other clusters. The related item identification module 118 analyzes the item network and extracts related data records (e.g., revealing competing products).

It is to be appreciated that this particular arrangement of modules 112, 114, 116 and 118 illustrated in the related record discovery system 105 of the FIG. 1 embodiment is presented by way of example only, and alternative arrangements can be used in other embodiments. For example, the functionality associated with one or more of the modules 112, 114, 116 and 118 in other embodiments can be implemented as a single module or device, or separated across a larger number of modules. As another example, multiple distinct processors can be used to implement different ones of modules 112, 114, 116 and 118, or portions thereof.

At least portions of modules 112, 114, 116 and 118 may be implemented at least in part in the form of software that is stored in memory and executed by a processor. An exemplary process utilizing one or more of modules 112, 114, 116 and 118 for an example related record discovery system 105 in computer network 100 will be described in more detail with reference to, for example, FIGS. 2 through 7.

Additionally, the related record discovery system 105 can have an associated electronic commerce data repository 106 configured to store, for example, data for a number of electronic commerce websites. In some embodiments, the electronic commerce data repository 106 may comprise the electronic commerce websites from which data is extracted (e.g., by the feature extraction module 112 using crawling techniques) for processing by the disclosed techniques for automatic discovery of related data records.

In addition, the related record discovery system 105 can have an associated item database 108 configured to store, for example, various data records associated with various products, for example, or other items, such as product type, product name, product price, product configuration and product family. In at least some embodiments, the exemplary data records comprise a plurality of features extracted from a data source, such as from the electronic commerce data repository 106. The features extracted from the electronic commerce data repository 106 may be associated with one or more additional products provided by competitors of a provider of a given product.

In one or more embodiments, the item database 108 is generated, at least in part, using crawling techniques on selected eCommerce websites to extract information about products of relevant brands and their relationship. For example, product information may be extracted for each product, such as: product type, product price, product title or name, product family and product configuration.

In addition, in some embodiments, the data records in the item database 108 can be enhanced by finding relationships between products using a collaborative filter (e.g., that identifies relationships such as "customers who bought a given product, also bought product X" or "customers who viewed a web page about a given product, also viewed a web page about product Y"). In this manner, the item database 108 stores information about the products of a given company or provider, as well as information about the products of other companies or providers.

In at least one embodiment, each data record in the item database 108 may correspond to a different item. In addition, at least one of the data records in the item database 108 identifies at least one item that is related to the item corresponding to the at least one data record. As discussed further below, the at least one related item is identified using a collaborative filter that relates at least some of the items of the plurality of items based at least in part on preferences of a plurality of users (such as web page viewing preferences and/or purchase preferences of users). For example, the collaborative filter may identify, for a given product, one or more additional products purchased by or researched by (e.g., web page viewed by) customers that also purchased or researched, respectively, the given product.

One or more of the electronic commerce data repository 106 and item database 108 in the present embodiment are implemented using one or more storage systems associated with the related record discovery system 105. Such storage systems can comprise any of a variety of different types of storage including such as network-attached storage (NAS), storage area networks (SANs), direct-attached storage (DAS) and distributed DAS, as well as combinations of these and other storage types, including software-defined storage.

At least some of the user devices 102 and the related record discovery system 105 may be implemented on a common processing platform, or on separate processing platforms. The user devices 102 (for example, when implemented as host devices) are illustratively configured to write data to and read data to/from the storage system in accordance with applications executing on those host devices for system users.

The computer network 100 may also comprise one or more storage devices, such as the storage systems used to implement one or more of the electronic commerce data repository 106 and item database 108. The storage devices illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

It is therefore to be appreciated that numerous different types of storage devices can be investigated in other embodiments. For example, a given storage system can include a combination of different types of protected storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANS, DAS and distributed DAS, as well as combinations of these and other storage types, including software-defined storage.

In some embodiments, communications between the user devices 102 over the network 104 with the related record discovery system 105 may comprise IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the related record discovery system 105, and/or other devices.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the related record discovery system 105 can be one or more input-output devices (not shown), which illustratively comprise keyboards, displays or other types of input-output devices in any combination. Such input-output devices can be used, for example, to support one or more user interfaces to the related record discovery system 105, as well as to support communication between the related record discovery system 105 and other related systems and devices not explicitly shown.

The user devices 102 and the related record discovery system 105 in the FIG. 1 embodiment are assumed to be implemented using at least one processing device. Each such processing device generally comprises at least one processor and an associated memory, and implements one or more functional modules for controlling certain features of the related record discovery system 105.

More particularly, user devices 102 and related record discovery system 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface allows the user devices 102 and/or the related record discovery system 105 to communicate over the network 104 with each other (as well as one or more other networked devices), and illustratively comprises one or more conventional transceivers.

It is to be understood that the particular set of elements shown in FIG. 1 for automatic discovery of related data records is presented by way of illustrative example only, and in other embodiments additional or alternative elements may be used. Thus, another embodiment includes additional or alternative systems, devices and other network entities, as well as different arrangements of modules and other components.

Figure 2:
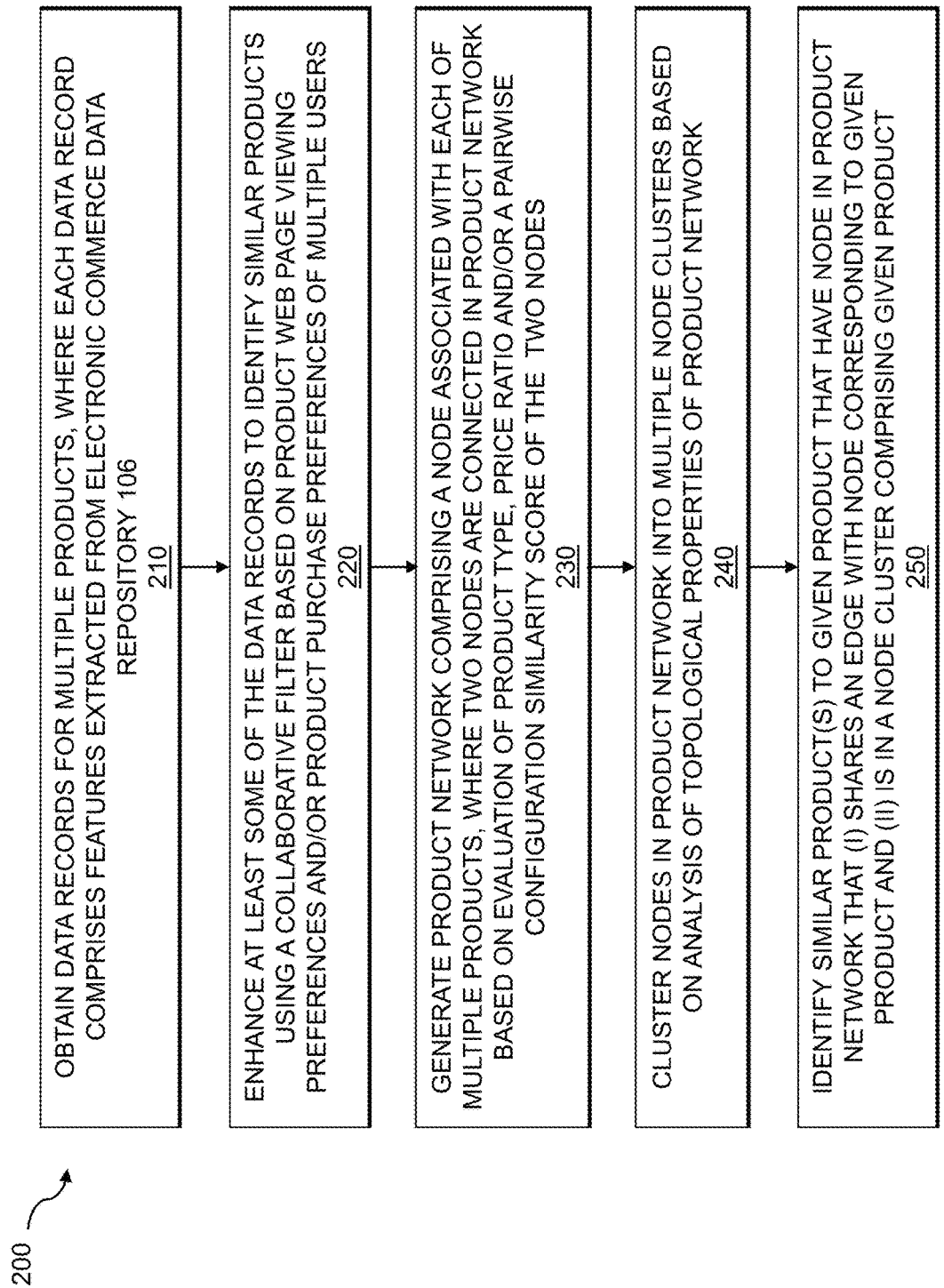
FIG. 2 is a flow diagram illustrating an exemplary implementation of a process for discovering similar products, according to some embodiments of the disclosure.

FIG. 2 is a flow diagram illustrating an exemplary implementation of a process 200 for automatic discovery of similar products, according to some embodiments of the disclosure. In the example of FIG. 2, data records are obtained in step 210 for multiple products, where each data record comprises features extracted from electronic commerce data repository 106. In step 220, at least some of the data records are enhanced to identify similar products using a collaborative filter based on product web page viewing preferences and/or product purchase preferences of multiple users.

A product network is generated in step 230 comprising a node associated with each of multiple products, where two nodes are connected in the product network based on an evaluation of a product type, price ratio and/or a pairwise configuration similarity score of the two nodes. The pairwise configuration similarity score for each pair of products may be determined in some embodiments using a similarity mechanism over the textual description of configurations for each product. Features may be generated, for example, using a bag-of-words (and/or word embedding techniques) and a Jaccard similarity and/or a cosine similarity of the extracted configuration feature(s) for each product in the pair. Generally, a Jaccard similarity or intersection over union is defined as a size of an intersection divided by a size of a union of two sets. A Cosine similarity calculates similarity by measuring a cosine of the angle between two vectors.

In this manner, the pairwise configuration similarity score for two products is based on a textual analysis of one or more configuration features extracted from the electronic commerce data repository 106 for each of the two products in a pair. The textual analysis of the one or more extracted configuration features for the two products comprises determining one or more of a Jaccard similarity and a cosine similarity of the one or more extracted configuration features.

The nodes in the product network are clustered into multiple node clusters in step 240 based on analysis of topological properties of the product network. Finally, similar product(s) to a given product are identified in step 250 that have a corresponding node in the product network that (i) shares an edge with the node corresponding to the given product and (ii) is in a node cluster that comprises the given product.

Figure 3:
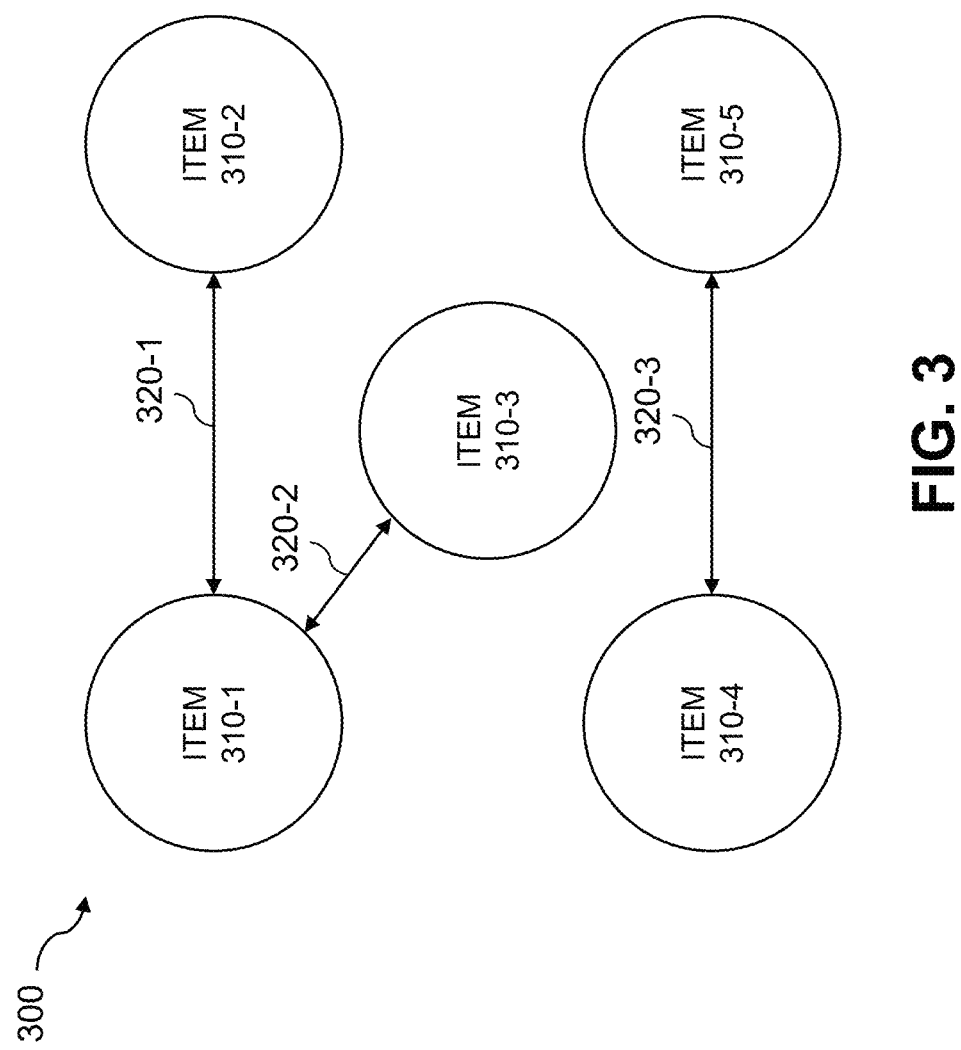
FIG. 3 illustrates an item network, according to an embodiment.

FIG. 3 illustrates an item network 300, according to an embodiment. As noted above, the item network generation module 114 generates a network structure of items using key features.

The exemplary item network 300 is generated from the data records in the item database 108. In the example of FIG. 3, the data records in the item database 108 are each related to different items 310-1 through 310-5 and the generated item network comprises the item network 300, wherein each node in the item network 300 corresponds to a different item 310. Potentially related items can be extracted from the item network 300 and the relationship between such items can be examined. In at least some embodiments, there will be an edge 320-1 through 320-3 between two nodes (e.g., p1, p2) if:

item p1 is of a same item type as item p2 (e.g., monitors or desktop computers); and
a price ratio between items p1 and p2 is below a defined threshold.

If the above two item rules apply, then an item configuration similarity evaluation is performed in some embodiments for the two items that includes performing a textual analysis of at least one configuration feature extracted from the electronic commerce data repository 106 for each of the two nodes. If the pairwise configuration similarity score for the configuration of items p1 and p2 is above a defined threshold then the nodes associated with items p1 and p2 are connected. The similarity score can be added to the item network 300 as a weight to the edge 320 that connects items p1 and p2. In this manner, the two items 310 corresponding to the items p1 and p2 in the item network 300 are connected by an edge 320 in response to the two corresponding items having a same item type and having a price ratio that satisfies one or more pricing criteria.

In at least some embodiments, the item network generation module 114 uses a link prediction model 115 to predict additional links or edges 320 in the item network, such as item network 300. Link prediction techniques can be employed to learn from the data in the item database 108 and the structure of the item network 300 to infer missing links/edges 320 to the item network 300 to enhance the collected data and make it more complete.

The link prediction model 115 is trained in at least some embodiments using one or more features of the item network (e.g., item network 300) that are extracted from the item network itself, wherein the trained link prediction model 115 identifies topological link patterns in the item network. The one or more features of the item network extracted from the item network may comprise, for example, a joint neighbor feature and/or a centrality of node feature. A threshold may be defined to control an "aggressiveness" of the addition of new links to the item network. The weight of the new edge will be equal to the pairwise configuration similarity score, described above.

As noted above, the network node clustering module 116 of FIG. 1 may cluster items 310 in the item network (e.g., item network 300), where the items 310 of a given cluster are more closely related to the items 310 within the given cluster than to the items 310 in other clusters. A community detection algorithm and/or a neighborhoods algorithm may be applied by the network node clustering module 116 in order to obtain topological information about the item network. The network node clustering module 116 provides a segregation of items 310 into distinct communities (some algorithms also support more than one community per item 310). Generally, the community detection algorithm and/or a neighborhoods algorithm find group of items 310 that are more closely related to themselves, than to the rest of the network. In the case of item network 300, items that are found in the same community will also be in the same domain, such as gaming laptops.

In one exemplary clustering method, a similarity measure quantifies a topological type of similarity between node pairs. For example, the similarity measure may comprise a cosine similarity, a Jaccard index, and/or a Hamming distance between nodes. Similar nodes are grouped into communities according to the similarity measure(s). Two groups can be considered separate communities, for example, only if all pairs of nodes in different groups have a similarity lower than a given threshold, and complete linkage clustering, in which all nodes within every group have a similarity greater than a threshold.

Figure 4:
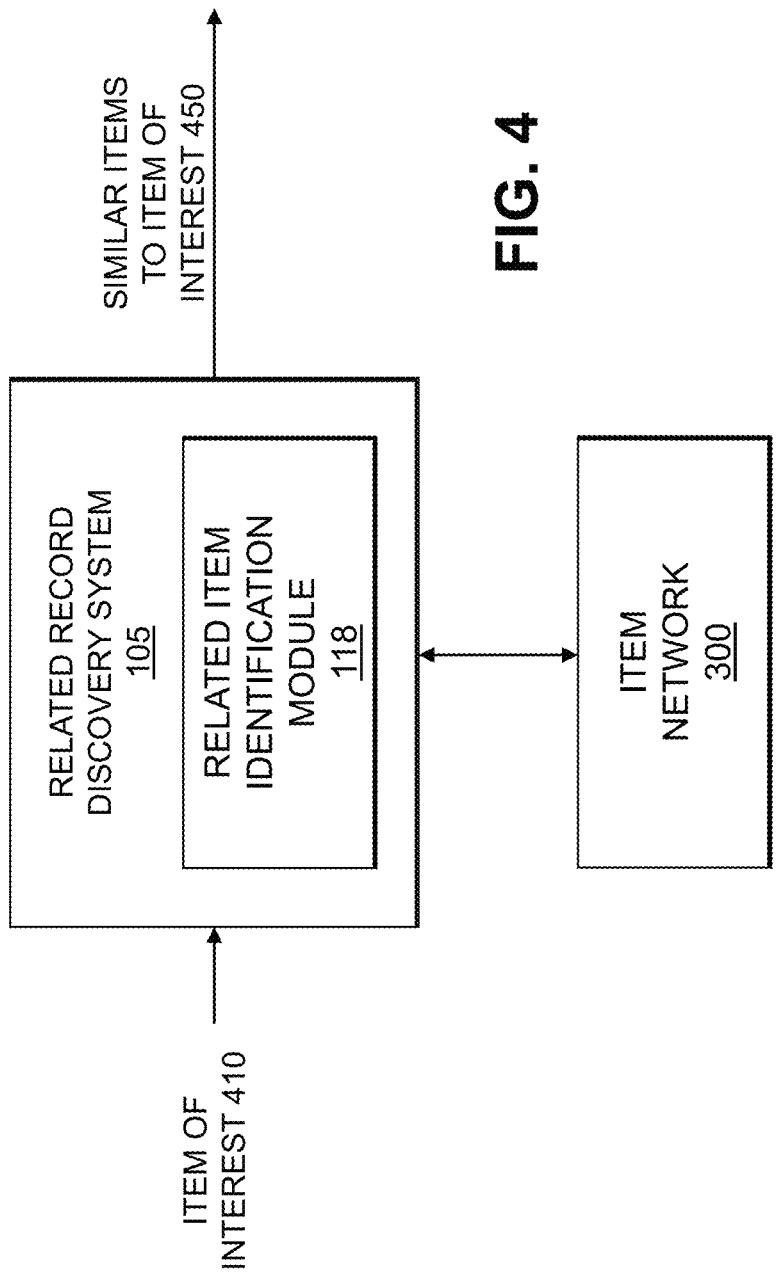
FIG. 4 illustrates the related record discovery system of FIG. 1 configured to identify one or more products that are similar to a product of interest, according to one embodiment.

FIG. 4 illustrates the related record discovery system 105 of FIG. 1 in further detail, configured to identify one or more items 450 that are similar to a given item of interest 410, according to one embodiment. In the example of FIG. 4, an item of interest 410 is applied to the related record discovery system 105. Given the item of interest 410, the related item identification module 118 will query the item network 300 of FIG. 3 and will identify the similar items 450.

In at least some embodiments, the similar items 450 are those items that have a corresponding item 310 in the item network 300 that (i) shares an edge 320 with a item 310 in the item network 300 corresponding to the given item of interest 410 and (ii) is in at least one node cluster 320 comprising the given item of interest 410. In further embodiments, the similar items 450 may be identified based on an evaluation of whether the potential similar items 450 are provided by the same provider or a different provider of the given item of interest 410.

Figure 5:
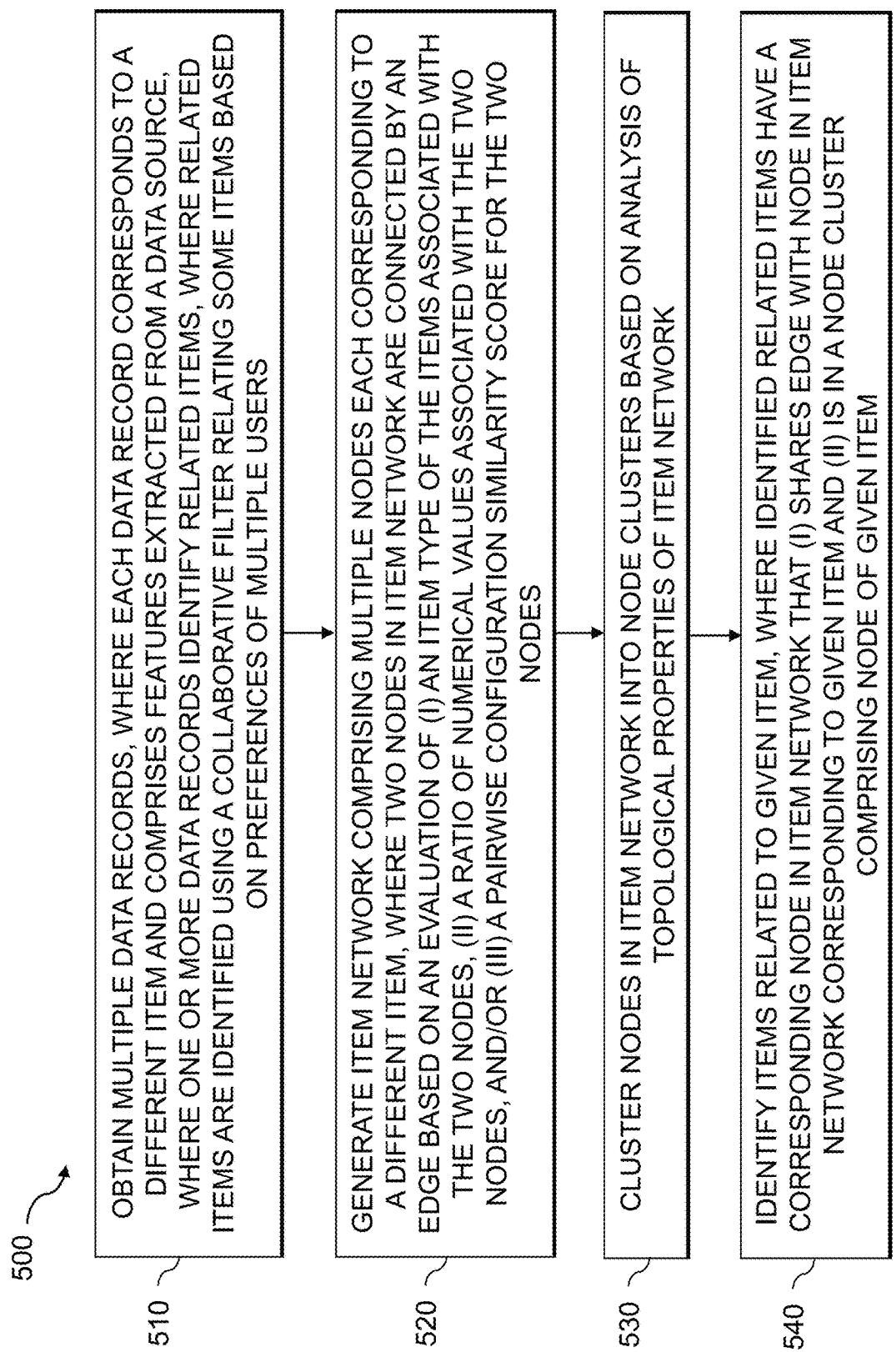
FIG. 5 is a flow diagram illustrating an exemplary implementation of a discovery process for identifying related data records, according to some embodiments of the disclosure.

FIG. 5 is a flow diagram illustrating an exemplary implementation of a discovery process 500 that identifies related data records, according to some embodiments of the disclosure. In step 510, the exemplary discovery process 500 obtains multiple data records, where each data record corresponds to a different item and comprises features extracted from at least one data source (e.g., the electronic commerce data repository 106), where or more one of the data records identify related items, and where the related items are identified using a collaborative filter that relates at least some of the items based on preferences of multiple users.

In step 520, the discovery process 500 generates an item network comprising multiple nodes, where each node in the item network corresponds to a different item, where two nodes in the item network are connected by an edge based on an evaluation of (i) an item type of the items associated with the two nodes, (ii) a ratio of numerical values (e.g., price) associated with the two nodes, and/or (iii) a pairwise configuration similarity score for the two nodes. The pairwise configuration similarity score for the two nodes can be based on, for example, a textual analysis of at least one configuration feature, extracted from the at least one data source (e.g., the electronic commerce data repository 106), for each of the two nodes.

The nodes in the item network are clustered in step 530 into node clusters based on an analysis of one or more topological properties of the item network. In step 540, the exemplary discovery process 500 identifies items related to a given item, where the identified related items have a corresponding node in the item network that (i) shares an edge with a node in the item network corresponding to the given item and (ii) is in at least one node cluster comprising a node corresponding to the given item.

The particular processing operations and other network functionality described in conjunction with the flow diagrams of FIGS. 2 and 5, for example, are presented by way of illustrative example only, and should not be construed as limiting the scope of the disclosure in any way. Alternative embodiments can use other types of processing operations for automatic discovery of related data records. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for automatic discovery of related data records can be employed to identify competing products, for example, to better assess a price of a given product. For example, the pricing of a given product may be compared to the pricing of the identified competing products. Among other benefits, the data-driven analysis of consumer data reflecting actual consumer behavior (e.g., by using a collaborative filter to assess preferences of multiple users) provide useful market insights with high resolution at a product level, and lower-level insights, such as names or other properties of competing products. In addition, the disclosed automatic discovery of related data records can assess new products or product information without requiring a manual compilation of competitor products list and monitoring by a domain expert, thereby conserving valuable human resources. Further, the automated nature of the disclosed techniques allow the process to be run more frequently, e.g., on a daily basis (or any other given frequency). Thus, any changes in market behavior can be reflected more quickly in the item network.

Given a list of one or more products to explore, the disclosed automatic discovery techniques for competing products can connecting results and create an item network that provides a map of the market environment for the given products. The item network allows insights to be drawn; for example, if a competitor has one product that competes strongly with several of the given products an investigation can be triggered to evaluate the identified strongly competitive product.

In one exemplary implementation, the related record discovery system 105 is given the name of an item of interest 410. The related record discovery system 105 then queries the item network 300 to return all products that:
 compete with the item of interest 410 (e.g., share an edge with the node in the item network 300 associated with the item of interest 410);
 share similar competing products (e.g., found in the same node cluster or community);
 flags each product as being provided by the same or a different provider as the item of interest 410.

One or more embodiments of the disclosure provide improved methods, apparatus and computer program products for automatic discovery of related data records. The foregoing applications and associated embodiments should be considered as illustrative only, and numerous other embodiments can be configured using the techniques disclosed herein, in a wide variety of different applications.

It should also be understood that the disclosed related data record discovery techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automatic discovery of related data records may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based related data record discovery engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based related data record discovery platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
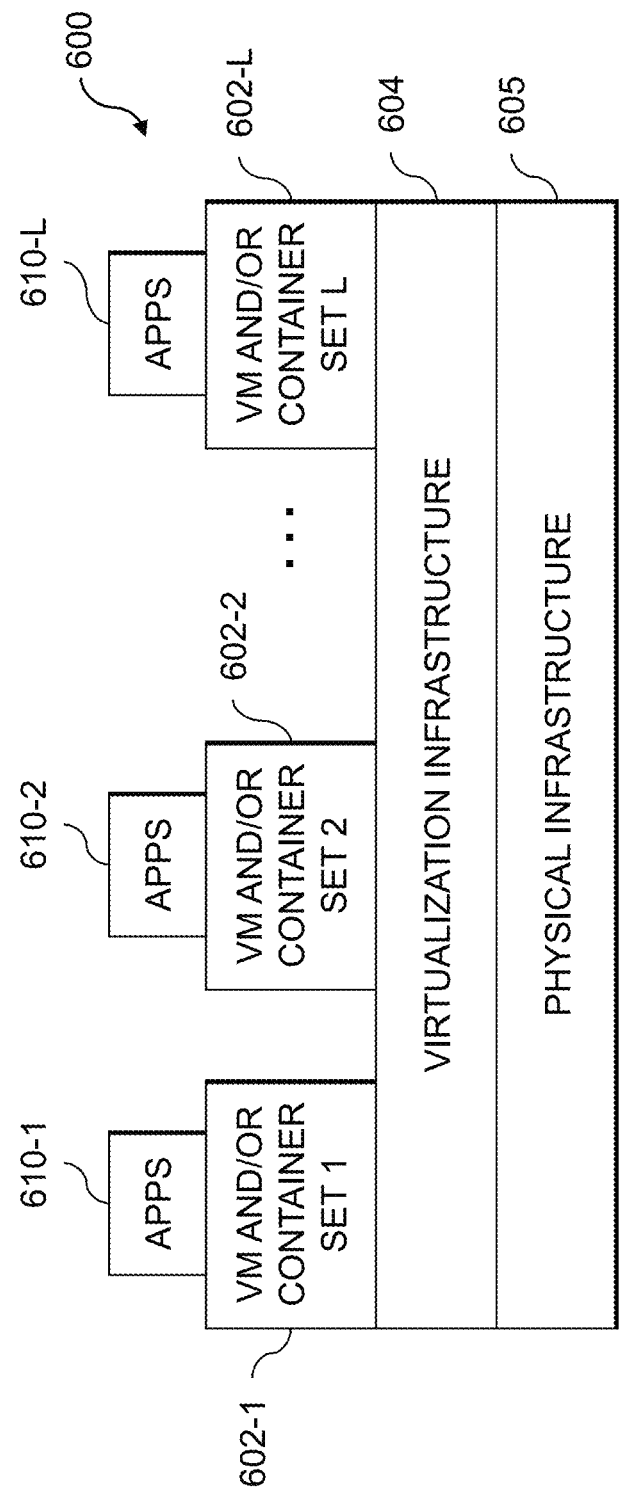
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide related data record discovery functionality of the type described above for one or more processes running on a given one of the VMs. For example, each of the VMs can implement related data record discovery control logic and item network processing functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide related data record discovery functionality of the type described above for one or more processes running on different ones of the containers. For example, a container host device supporting multiple containers of one or more container sets can implement one or more instances of related data record discovery control logic and associated item network processing functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
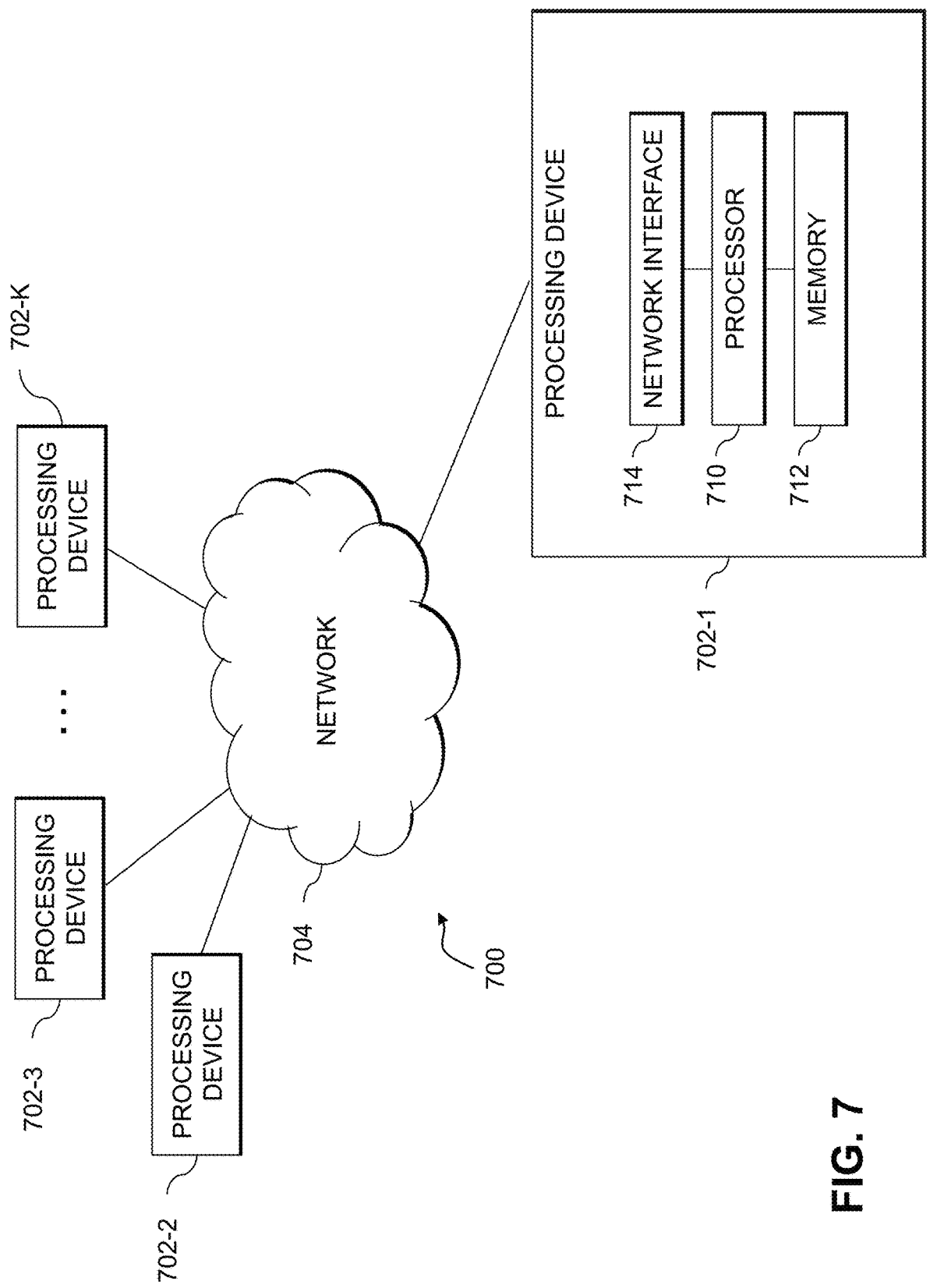
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a plurality of data records, wherein each data record corresponds to a different one of a plurality of items and comprises a plurality of features extracted from at least one data source, wherein at least one data record associated with a first item identifies at least one related item that is related to the first item, wherein the at least one related item is identified in the plurality of data records using a collaborative filter that relates at least some of the items of the plurality of items based at least in part on preferences of a plurality of users, and wherein the collaborative filter identifies, for a given item, one or more additional items obtained or researched by one or more users that also obtained or researched, respectively, the given item;
    generating, using the plurality of data records, an item network comprising a plurality of nodes, wherein each node in the item network corresponds to a different one of the plurality of items, wherein two nodes in the item network are selectively connected by an edge in response to an evaluation of: (i) an item type of the items associated with the two nodes, (ii) a ratio of numerical values associated with the two nodes, and (iii) a pairwise configuration similarity score for the two nodes, wherein the pairwise configuration similarity score for the two nodes is based at least in part on a similarity analysis of a textual description of a configuration of each of the items associated with the two nodes, extracted from the at least one data source, for each of the two nodes, wherein the two nodes in the item network are selectively connected by the edge in response to the evaluation determining that: (i) the respective item types of the items associated with the two nodes satisfy one or more similarity criteria, (ii) the ratio of the numerical values associated with the two nodes satisfies a first designated threshold, and (iii) the pairwise configuration similarity score for the two nodes satisfies a second designated threshold, wherein the first designated threshold and the second designated threshold are distinct and wherein the ratio of the numerical values is distinct from the pairwise configuration similarity score;
    clustering the plurality of nodes in the item network into a plurality of node clusters based at least in part on an analysis of one or more topological properties of the item network;
    identifying one or more items related to a given item by querying the item network to return the one or more identified related items having a corresponding node in the item network that (i) shares an edge with a node in the item network corresponding to the given item and (ii) are in at least one node cluster comprising a node corresponding to the given item; and
    initiating an automated processing of at least a given one of the plurality of data records associated with the given item using at least some of the identified one or more items related to the given item;
    wherein the method is performed by at least one processing device comprising a processor coupled to a memory.

2. The method of claim 1, wherein the plurality of items comprises a plurality of products and wherein the features extracted from the at least one data source comprise one or more of a product type, a product name, a product price, a product configuration and a product family.

3. The method of claim 1, wherein the plurality of items comprises a plurality of products and wherein the plurality of features is extracted from the at least one data source for one or more additional products provided by competitors of a provider of a given product.

4. The method of claim 1, wherein the plurality of items comprises a plurality of products and wherein the collaborative filter identifies, for a given product, one or more additional products purchased or researched by customers that also purchased or researched, respectively, the given product.

5. The method of claim 1, wherein the plurality of items comprises a plurality of products and wherein the two nodes in the item network are connected by the edge in response to the two corresponding products having a same product type and having a price ratio that satisfies one or more pricing criteria.

6. The method of claim 1, further comprising adding one or more edges to the item network using a prediction model trained using one or more features of the item network extracted from the item network, wherein the trained prediction model identifies topological link patterns in the item network to predict at least one missing edge to add to the item network, wherein a weight of the at least one added edge is based at least in part on the pairwise configuration similarity score for the two nodes connected by the at least one added edge.

7. The method of claim 1, wherein the nodes in a given cluster are more closely related to the nodes in the given cluster than to the nodes in other clusters.

8. The method of claim 1, wherein the similarity analysis of the textual description of the configuration of each of the items associated with the two nodes comprises one or more of determining a Jaccard similarity and determining a cosine similarity of the configuration of each of the items associated with the two nodes.

9. The method of claim 1, wherein the plurality of items comprises a plurality of products and wherein the identifying one or more items related to the given item comprises identifying, for a given product, one or more additional products that: (i) are associated with nodes in the item network that share an edge with the node associated with the given product and (ii) are found in the same cluster as the given product.

10. The method of claim 1, further comprising querying the item network for a particular item of interest to a particular organization, wherein the query returns one or more items that (i) share an edge with a node in the item network corresponding to the particular item, wherein the one or more items that share the edge with the node corresponding to the particular item comprise items competing with the particular item of interest and (ii) are in at least one node cluster comprising a node corresponding to the particular item, wherein the one or more items in the at least one node cluster comprise similar items competing with the particular item of interest.

11. The method of claim 10, further comprising identifying whether the one or more items returned by the query are provided by one or more of the particular organization and a different organization.

12. The method of claim 1, wherein the evaluation of the pairwise configuration similarity score for the two nodes is performed in response to the evaluation determining that the respective item types of the items associated with the two nodes satisfy the one or more similarity criteria and the ratio of the numerical values associated with the two nodes satisfies the first designated threshold.

13. An apparatus comprising:
at least one processing device comprising a processor coupled to a memory;
the at least one processing device being configured to implement the following steps:
obtaining a plurality of data records, wherein each data record corresponds to a different one of a plurality of items and comprises a plurality of features extracted from at least one data source, wherein at least one data record associated with a first item identifies at least one related item that is related to the first item, wherein the at least one related item is identified in the plurality of data records using a collaborative filter that relates at least some of the items of the plurality of items based at least in part on preferences of a plurality of users, and wherein the collaborative filter identifies, for a given item, one or more additional items obtained or researched by one or more users that also obtained or researched, respectively, the given item;
generating, using the plurality of data records, an item network comprising a plurality of nodes, wherein each node in the item network corresponds to a different one of the plurality of items, wherein two nodes in the item network are selectively connected by an edge in response to an evaluation of: (i) an item type of the items associated with the two nodes, (ii) a ratio of numerical values associated with the two nodes, and (iii) a pairwise configuration similarity score for the two nodes, wherein the pairwise configuration similarity score for the two nodes is based at least in part on a similarity analysis of a textual description of a configuration of each of the items associated with the two nodes, extracted from the at least one data source, for each of the two nodes, wherein the two nodes in the item network are selectively connected by the edge in response to the evaluation determining that: (i) the respective item types of the items associated with the two nodes satisfy one or more similarity criteria, (ii) the ratio of the numerical values associated with the two nodes satisfies a first designated threshold, and (iii) the pairwise configuration similarity score for the two nodes satisfies a second designated threshold, wherein the first designated threshold and the second designated threshold are distinct and wherein the ratio of the numerical values is distinct from the pairwise configuration similarity score;
clustering the plurality of nodes in the item network into a plurality of node clusters based at least in part on an analysis of one or more topological properties of the item network;
identifying one or more items related to a given item by querying the item network to return the one or more identified related items having a corresponding node in the item network that (i) shares an edge with a node in the item network corresponding to the given item and (ii) are in at least one node cluster comprising a node corresponding to the given item; and
initiating an automated processing of at least a given one of the plurality of data records associated with the given item using at least some of the identified one or more items related to the given item.

14. The apparatus of claim 13, further comprising adding one or more edges to the item network using a prediction model trained using one or more features of the item network extracted from the item network, wherein the trained prediction model identifies topological link patterns in the item network to predict at least one missing edge to add to the item network, wherein a weight of the at least one added edge is based at least in part on the pairwise configuration similarity score for the two nodes connected by the at least one added edge, wherein the one or more features of the item network extracted from the item network comprise one or more of a joint neighbor feature and a centrality of node feature.

15. The apparatus of claim 13, wherein the similarity analysis of the textual description of the configuration of each of the items associated with the two nodes comprises one or more of determining a Jaccard similarity and determining a cosine similarity of the configuration of each of the items associated with the two nodes.

16. The apparatus of claim 13, wherein the plurality of items comprises a plurality of products and wherein the identifying one or more items related to the given item comprises identifying, for a given product, one or more additional products that: (i) are associated with nodes in the item network that share an edge with the node associated with the given product and (ii) are found in the same cluster as the given product.

17. A non-transitory processor-readable storage medium having stored therein program code of one or more software programs, wherein the program code when executed by at least one processing device causes the at least one processing device to perform the following steps:

obtaining a plurality of data records, wherein each data record corresponds to a different one of a plurality of items and comprises a plurality of features extracted from at least one data source, wherein at least one data record associated with a first item identifies at least one related item that is related to the first item, wherein the at least one related item is identified in the plurality of data records using a collaborative filter that relates at least some of the items of the plurality of items based at least in part on preferences of a plurality of users, and wherein the collaborative filter identifies, for a given item, one or more additional items obtained or researched by one or more users that also obtained or researched, respectively, the given item;

generating, using the plurality of data records, an item network comprising a plurality of nodes, wherein each node in the item network corresponds to a different one of the plurality of items, wherein two nodes in the item network are selectively connected by an edge in response to an evaluation of: (i) an item type of the items associated with the two nodes, (ii) a ratio of numerical values associated with the two nodes, and (iii) a pairwise configuration similarity score for the two nodes, wherein the pairwise configuration similarity score for the two nodes is based at least in part on a similarity analysis of a textual description of a configuration of each of the items associated with the two nodes, extracted from the at least one data source, for each of the two nodes, wherein the two nodes in the item network are selectively connected by the edge in response to the evaluation determining that: (i) the respective item types of the items associated with the two nodes satisfy one or more similarity criteria, (ii) the ratio of the numerical values associated with the two nodes satisfies a first designated threshold, and (iii) the pairwise configuration similarity score for the two nodes satisfies a second designated threshold, wherein the first designated threshold and the second designated threshold are distinct and wherein the ratio of the numerical values is distinct from the pairwise configuration similarity score;

clustering the plurality of nodes in the item network into a plurality of node clusters based at least in part on an analysis of one or more topological properties of the item network;

identifying one or more items related to a given item by querying the item network to return the one or more identified related items having a corresponding node in the item network that (i) shares an edge with a node in the item network corresponding to the given item and (ii) are in at least one node cluster comprising a node corresponding to the given item; and initiating an automated processing of at least a given one of the plurality of data records associated with the given item using at least some of the identified one or more items related to the given item.

18. The non-transitory processor-readable storage medium of claim 17, wherein the plurality of items comprises a plurality of products and wherein the collaborative filter identifies, for a given product, one or more additional products purchased or researched by customers that also purchased or researched, respectively, the given product.

19. The non-transitory processor-readable storage medium of claim 17, further comprising adding one or more edges to the item network using a prediction model trained using one or more features of the item network extracted from the item network, wherein the trained prediction model identifies topological link patterns in the item network to predict at least one missing edge to add to the item network, wherein a weight of the at least one added edge is based at least in part on the pairwise configuration similarity score for the two nodes connected by the at least one added edge, wherein the one or more features of the item network extracted from the item network comprise one or more of a joint neighbor feature and a centrality of node feature.

20. The non-transitory processor-readable storage medium of claim 17, wherein the plurality of items comprises a plurality of products and wherein the identifying one or more items related to the given item comprises identifying, for a given product, one or more additional products that: (i) are associated with nodes in the item network that share an edge with the node associated with the given product and (ii) are found in the same cluster as the given product.

* * * * *